(12) United States Patent
Volkert et al.

(10) Patent No.: US 6,331,577 B1
(45) Date of Patent: Dec. 18, 2001

(54) PROCESS FOR PRODUCING ELASTIC POLYURETHANE MOLDINGS WITH COMPACT SURFACES AND CELLULAR CORES

(75) Inventors: Otto Volkert, Weisenheim; Klaus Pittrich, Herrsching, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/171,537

(22) PCT Filed: Apr. 24, 1997

(86) PCT No.: PCT/EP97/02101

§ 371 Date: Apr. 30, 1999

§ 102(e) Date: Apr. 30, 1999

(87) PCT Pub. No.: WO97/42244

PCT Pub. Date: Nov. 13, 1997

(30) Foreign Application Priority Data

May 8, 1996 (DE) ............................................... 196 18 392

(51) Int. Cl.[7] .................................................... C08G 18/10
(52) U.S. Cl. .......................... 521/159; 521/51; 521/137; 521/160; 521/170; 521/172; 521/174
(58) Field of Search ............................. 521/51, 137, 159, 521/160, 170, 172, 174

(56) References Cited

U.S. PATENT DOCUMENTS

| | | |
|---|---|---|
| 3,644,457 | 2/1972 | Konig et al. . |
| 4,525,490 | 6/1985 | Smith . |
| 5,658,959 * | 8/1997 | Voloppi et al. .......................... 521/51 |

FOREIGN PATENT DOCUMENTS

| | | |
|---|---|---|
| 1 618 380 | 3/1967 | (DE) . |
| 40 32 148A1 | 10/1992 | (DE) . |
| 0 013 487 A1 | 12/1979 | (EP) . |
| 0 235 888 A1 | 1/1987 | (EP) . |
| 0 355 000 A1 | 7/1989 | (EP) . |
| 0 451 559 A2 | 3/1991 | (EP) . |
| 0 480 583 A2 | 9/1991 | (EP) . |
| 0 582 385 A1 | 7/1993 | (EP) . |
| WO 94/29361 | 6/1993 | (WO) . |

* cited by examiner

*Primary Examiner*—John M. Cooney, Jr.
(74) *Attorney, Agent, or Firm*—Fernando A. Borrego

(57) ABSTRACT

Elastic polyurethane moldings having a compact surface and a cellular core are produced by reacting a) modified organic polyisocyanates with b) at least one relatively high molecular weight compound containing at least two reactive hydrogen atoms and, if desired, c) low molecular weight chain extenders in the presence of d) blowing agents, e) catalysts and, if desired, f) customary auxiliaries and/or additives in a closed mold with compaction, wherein the modified organic polyisocyanate used is at least one reaction product of pure MDI and at least one polyether alcohol (polyoxyalkylene polyol), the modified organic polyisocyanate having an NCO content of <15% by weight.

16 Claims, No Drawings

PROCESS FOR PRODUCING ELASTIC POLYURETHANE MOLDINGS WITH COMPACT SURFACES AND CELLULAR CORES

Elastic polyurethane moldings having a compact surface and a cellular core, known as flexible integral polyurethane foams, have been known for a long time and have various applications. Typical fields of use are elastic parts in the automobile sector, for example armrests, foam cladding of steering wheels and spoilers, or shoe soles.

Particularly in the case of shoe soles, very good mechanical properties, high elasticity and low abrasion are demanded.

The production of polyurethane shoe soles is usually carried out by the following process:

In a mixing machine, the constituents of the polyurethane system, viz. the polyol component, usually designated as the A component, and the isocyanate component, usually designated as the B component, are mixed and the mixture is poured into a metal mold. In the mold, the foaming process occurs to form an integral density distribution.

The A component, also described as the polyol component, usually consists of one or more high molecular weight polyols, customarily polyether and/or polyester polyols, one or more low molecular weight H-functional chain extenders, the blowing agent, catalysts, foam stabilizers and other foam auxiliaries.

The isocyanate component used is usually 4,4'-diisocyanatodiphenylmethane, also described as "pure MDI". Since pure MDI is solid at room temperature and therefore difficult to process, it is usually "liquefied" by modification. Thus, the pure MDI can be modified by partial formation of carbodiimide or uretonimine structures. However, in the production of shoe soles, this modification can only be used to a subordinate extent, since it increases the functionality of the B component which leads to poorer mechanical properties of the foams. The use of higher-functional MDI homologues, known as raw MDI, also leads to a drastic increase in the crosslinking density and thus to a fall in the mechanical property values, so that this modification plays practically no role in the production of shoe soles.

The customary way of liquefying the MDI is the preparation of prepolymers by reacting pure MDI with polyols. Typical polyols for this purpose are dipropylene glycol, tripropylene glycol, or else higher molecular weight polyols as are used in the A component.

To prepare the prepolymers, the pure MDI is reacted with an amount of polyol, in particular diol, such that the prepolymer has an NCO content of from 18 to 23% by weight.

A series of possible ways of preparing prepolymers is known from the prior art. Thus, EP-A-013 487 describes uretonimine-modified MDI prepolymers. The prepolymers have NCO contents of about 18% by weight. EP-A-235 888 describes microcellular elastomers based on polyester polyols containing alkanolamines. The isocyanate component used comprises prepolymers of MDI and amine-containing polyester alcohols having an NCO content of about 18% by weight. In EP-A-451 559, urethane- and carbodiimide-modified MDI is reacted with polyether polyols to form cellular polyurethane integral foams. EP-A-582 385 describes an NCO-terminated prepolymer of MDI and polyether polyols having an NCO content of from 17 to 21% by weight, which can be converted into microcellular elastomers. DE-A-1 618 380 describes NCO-terminated prepolymers which are liquid at room temperature, have molecular weights up to 700 and are prepared from MDI and branched aliphatic dihydroxy compounds. The NCO content of these prepolymers is from 15 to 25% by weight. WO 91/17197 describes the production of microcellular polyurethane elastomers which are used, for example, for shoe soles. The isocyanate component used here comprises prepolymers of MDI and polytetramethylene glycol having NCO contents of from 14 to 28% by weight. However, the storage stability of such prepolymers based on polytetramethylene glycol is unsatisfactory. WO 92/22595 describes prepolymers of MDI and a polyol mixture comprising a branched diol or triol and at least one 2- to 4-functional polyoxyalkylene polyol. The NCO contents of the prepolymers are in the range from 15 to 19% by weight.

A substantial disadvantage of the processes of the prior art is that when water is used as blowing agent it is not possible to produce shoe soles having a density of less than 400 g/l, since the parts then shrink. Furthermore, the elasticity of such foams is unsatisfactory: the rebound resilience of such plates is only from 20 to 25%, which is insufficient for use in shoe sole systems.

It is an object of the present invention to find a process for producing flexible integral polyurethane foams which uses water as blowing agent and gives parts which have a high elasticity and do not shrink even at densities of the moldings of below 400 g/l.

We have found that this object is achieved when the isocyanate component used in the production of flexible integral foams is a prepolymer of pure MDI and at least one polyoxypropylene polyol and/or polyoxypropylene-polyoxyethylene polyol having an NCO content of <15% by weight, preferably <13% by weight, and the mixing ratio of polyol to isocyanate component in the foaming process is <1.

The invention accordingly provides a process for producing high elasticity polyurethane moldings having a compact surface and a cellular core by reacting a) modified organic polyisocyanates with b) at least one compound containing at least two reactive hydrogen atoms and having a molecular weight of from 1000 to 8000 c) chain extenders in the presence of d) blowing agents, e) catalysts and, if desired, f) customary auxiliaries and/or additives in a closed mold with compaction, wherein the modified organic polyisocyanate (a) which is used is a reaction product of 4,4'-diisocyanatodiphenylmethane with at least one polyoxypropylene polyol and/or polyoxypropylene-polyoxyethylene polyol having an NCO content of <15% by weight, in particular <13% by weight, and the weight ratio of a) to (b+c+d+e+f) is greater than 1, the chain extenders c) used are diols having a molecular weight of <400 and the blowing agent d) used is water.

For the purposes of the present invention, "high elasticity" means that the rebound resilience in accordance with DIN 53512 is at least 35%.

The polyoxypropylene polyols and polyoxypropylene-polyoxyethylene polyols used for preparing the modified organic polyisocyanates are preferably 2- to 3-functional. They are usually prepared by the generally known base-catalyzed molecular addition of propylene oxide, alone or in admixture with ethylene oxide, to H-functional, in particular OH-functional, initiator substances. Examples of initiator substances used are water, ethylene glycol or propylene glycol, or else glycerol or trimethylolpropane.

When ethylene oxide/propylene oxide mixtures are employed, the ethylene oxide is preferably used in an amount of 10–50% by weight, based on the total amount of alkylene oxide. The alkylene oxides can here be incorporated blockwise or as a random mixture. Particular preference is given to the incorporation of an ethylene oxide end block ("EO cap"), in order to increase the content of more reactive primary OH end groups.

The polyether polyols used for preparing the modified organic polyisocyanates have a functionality of from 2 to 3 and molecular weights of from 1000 to 8000, preferably from 2000 to 6000.

Preference is given to using diols based on polyoxypropylene having about 20% by weight of polyoxyethylene units at the chain end, so that >80% of the OH groups are primary OH groups. The molecular weight of these diols is preferably from 2000 to 4500.

The prepolymers used according to the present invention are prepared in a manner known per se, by reacting the pure MDI at about 80° C. with the polyols to give the prepolymer. To prevent secondary reactions caused by atmospheric oxygen, the reaction vessel should be flushed with an inert gas, preferably nitrogen. The polyol/polyisocyanate ratio is selected such that the NCO content of the prepolymer is <15% by weight, preferably <13% by weight.

The pure MDI used can contain small amounts, up to about 5% by weight, of allophanate- or uretonimine-modified polyisocyanates. Small amounts of polyphenylenepolymethylene polyisocyanate (raw MDI) can also be used. The total amount of these high-functional polyisocyanates should not exceed 5% by weight of the isocyanate used, in order to avoid undesired crosslinking and thus an impairment of the mechanical properties of the resulting foams.

For certain applications, it can be useful to use mixtures of pure MDI and other aromatic diisocyanates, for example 2,4- or 2,4'-diisocyanatodiphenylmethane. However, the proportion of these diisocyanates should not exceed 10% by weight.

Relatively high molecular weight compounds b) containing at least two H atoms reactive toward isocyanate groups are preferably polyether polyols. They are prepared by known methods, for example from one or more alkylene oxides having from 2 to 4 carbon atoms in the alkylene radical by anionic polymerization using alkali metal hydroxides or alkali metal alkoxides as catalysts with addition of at least one initiator molecule containing 2 or 3 reactive hydrogen atoms in bonded form, or by cationic polymerization using Lewis acids such as antimony pentachloride or boron fluoride etherate. Suitable alkylene oxides are, for example, tetrahydrofuran, 1,3-propylene oxide, 1,2- or 2,3-butylene oxide and preferably ethylene oxide and 1,2-propylene oxide. The alkylene oxides can be used individually, alternately in succession or as mixtures. Preference is given to mixtures of 1,2-propylene oxide and ethylene oxide, with the ethylene oxide being used in amounts of from 10 to 50% as ethylene oxide end block ("EO cap"), so that the polyols formed have over 70% of primary OH end groups.

Suitable initiator molecules are water or dihydric and trihydric alcohols such as ethylene glycol, 1,2- and 1,3-propanediol diethylene glycol, dipropylene glycol, 1,4-butanediol, glycerol, trimethylolpropane, etc.

The polyether polyols, preferably polyoxypropylene-polyoxyethylene polyols, thus have a functionality of from 2 to 3 and molecular weights of from 1000 to 8000, preferably from 2000 to 6000.

Other suitable polyetherols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, eg. in a weight ratio of from 90:10 to 10:90, preferably from 70:30 to 30:70, advantageously in the abovementioned polyether polyols using methods similar to those described in the German Patents 1 111 394, 1 222 669 (U.S. Pat. Nos. 3,304,273, 3,383,351, 3,523,093), 1,152,536 (GB 1 040 452) and 1 152 537 (GB 987 618) and also polyether dispersions which comprise as dispersed phase, usually in an amount of from 1 to 50% by weight, preferably from 2 to 25% by weight: eg. polyureas, polyhydrazides, polyurethanes containing bonded tertiary amino groups and/or melamine and are described, for example, in EP-B-11752 (U.S. Pat. No. 4,304,708), U.S. Pat. No. 4,374,209 and DE-A-32 31 497.

Also suitable are polyester polyols. These can be prepared, for example, from organic dicarboxylic acids having from 2 to 12 carbon atoms, preferably aliphatic dicarboxylic acids having from 4 to 6 carbon atoms, and polyhydric alcohols, for example diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32, and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, for example aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc., in the melt at from 150 to 250° C., preferably from 180 to 220° C., at atmospheric pressure or under reduced pressure, to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation. To prepare the polyester polyols, the organic polycarboxylic acids and/or derivatives and polyhydric alcohols are advantageously polycondensed in a molar ratio of 1:1–1.8, preferably 1:1.05–1.2.

The polyester polyols obtained preferably have a functionality of from 2 to 4, in particular from 2 to 3, and a molecular weight of from 480 to 3000, preferably from 1000 to 3000.

Low molecular weight chain extenders c) used are diols having molecular weights of <400, preferably from 60 to 150.

Examples are ethylene glycol, 1,4-butanediol and diethylene glycol. The chain extenders can be used individually or as mixtures. Their amount is from 4 to 30% by weight, preferably from 5 to 15% by weight, based on the weight of the components b) and c).

As blowing agent (d), preference is given to using water. To improve processability, it is possible to mix in small amounts of an ancillary blowing agent. Such ancillary blowing agents include the customary volatile substances such as n-pentane, cyclopentane or tetrafluoroethane, etc.

Catalysts e) used for producing the integral foams are, in particular, compounds which strongly accelerate the reaction of the hydroxyl-containing compounds of the components b) and c) with the polyisocyanates a).

Suitable catalysts are, for example, tin(II) compounds such as tin diacetate or tin dioctoate or dialkyltin(IV) salts such as dibutyltin dilaurate, etc. The metal compounds are usually used in combination with strongly basic amines. Examples of these are triethylamine, pentamethyldiethylenetriamine, bis(dimethylaminoethyl) ether, 1,2-dimethylimidazole or preferably triethylenediamine (Dabco).

If desired, further auxiliaries and/or additives f) can also be incorporated into the reaction mixture for producing the moldings. Examples which may be mentioned are surface-active substances, foam stabilizers, cell regulators, external and internal mold release agents, fillers, dyes, pigments, flame retardants, hydrolysis inhibitors, fungistatic and bacteriostatic substances.

Further information about the starting materials used may be found, for example, in the Kunststoffhandbuch, Volume 7, "Polyurethane", edited by Günter Oertel, Carl-Hanser-Verlag, Munich, 3rd Edition, 1993.

To produce the moldings, the organic polyisocyanates a), relatively high molecular weight compounds containing at least 2 reactive hydrogen atoms b) and, if desired, chain extenders c) are reacted in amounts such that the equivalence ratio of NCO groups of the polyisocyanates a) to the sum of the reactive hydrogen atoms of the components b) and, if used, c) is from 1:0.8 to 1:1.25, preferably from 1:0.9 to 1:1.15.

Owing to the low NCO content of the modified organic polyisocyanates, the weight ratio of the component a) to the sum of the components b to f) is greater than 1.

The moldings are produced by the one-shot process using the low-pressure or high-pressure technique in closed, advantageously heated molds. The molds are usually made of metal, eg. aluminum or steel. These procedures are described, for example, by Piechota and Röhr in "Integralschaumstoff", Carl-Hanser-Verlag, Munich, Vienna, 1975, or in the Kunststoff-Handbuch, Volume 7, Polyurethane, 2nd Edition, 1983, pages 333ff.

The starting components are mixed at from 15 to 90° C., preferably at from 20 to 35° C., and introduced, if desired under increased pressure, into the closed mold. The mixing can be carried out mechanically by means of a stirrer or a stirring spiral or under high pressure by the countercurrent injection method. The mold temperature is advantageously from 20 to 90° C., preferably from 30 to 60° C.

The amount of reaction mixture introduced into the mold is such that the integral foam moldings obtained have a density of from, 80 to 700 g/l, in particular from 120 to 600 g/l. The degrees of compaction for producing the moldings having a compacted surface zone and a cellular core are in the range from 1.1 to 8.5, preferably from 2 to 7.

The integral foams produced by the process of the present invention have a significantly improved elasticity compared with the products produced by conventional processes. Thus, the rebound resilience was able to be increased to values of 50% without impairing the other mechanical properties. Surprisingly, there was no shrinkage even at densities of less than 300 g/l, so that in this way it is possible for the first time to easily produce such low-density moldings for shoe sole applications.

The prepolymers used according to the present invention are stable for weeks at room temperature, although an increased tendency to crystallize would have to have been expected because of the low NCO content.

EXAMPLES

Example 1 a) Preparation of the Prepolymer 40 parts by weight of 4,4'-diisocyanatodiphenylmethane (pure MDI) and 2 parts by weight of uretonimine-modified pure MDI (Lupranat® MM 103 from BASF AG) were melted under a nitrogen atmosphere in a three-necked flask and admixed at 80° C. while stirring with 58 parts by weight of a polyoxypropylene(80% by weight)-polyoxyethylene (20% by weight) glycol having a hydroxyl number of 27 mg KOH/g using 1,2-propanediol as initiator molecule. To complete the reaction, the mixture was heated for 1 hour at 80° C. and subsequently allowed to cool. This gave a virtually colorless liquid having an NCO content of 12.5% and a viscosity (at 25° C.) of 1000 mPa·s. The liquid was stable for weeks at room temperature.

b) Production of the Iintegral Foam

| A component | |
| --- | --- |
| 78 parts by weight of | polyoxypropylene (80% by weight)-polyoxyethylene (20% by weight) glycol having a hydroxyl number of 27 mg KOH/g, prepared using glycerol as initiator molecule |
| 20 parts by weight of | 1,4-butanediol |
| 0.6 part by weight of | triethylenediamine |
| 0.1 part by weight of | dibutyltin dilaurate |
| 0.3 part by weight of | a foam stabilizer based on silicone (DC 193 from Dow Corning) |
| 1.0 part by weight of | water |

B Component
Prepolymer from Example 1a 100 parts by weight of the A component and 183 parts by weight of the B component were intensively mixed at 23° C. and the mixture was introduced into a plate-shaped mold of aluminum having the dimensions 20 cm×20 cm×1 cm and heated to 50° C. in such an amount that after foaming and allowing to cure in the closed mold there resulted an integral foam plate having an overall density of 550 g/l.

Example 2 a) Preparation of a Prepolymer 43 parts by weight of pure MDI and 2 parts by weight of uretonimine-modified pure MDI (Lupranat® MM 103) were reacted as described in Example 1a with 55 parts by weight of polyoxypropylene having a hydroxyl number of 56 mg KOH/g using 1,2-propanediol as initiator molecule.

This gave a virtually colorless liquid having an NCO content of 12.4% and a viscosity (at 25° C.) of 1380 mPas. The liquid was stable on storage.

b) Production of the Integral Foam

| A component | |
|---|---|
| 81.6 parts by weight of | polyoxypropylene (80% by weight)-polyoxyethylene (20% by weight) glycol having a hydroxyl number of 27 mg KOH/g, prepared using glycerol as initiator molecule |
| 15.9 parts by weight of | 1,4-butanediol |
| 1.2 parts by weight of | triethylenediamine |
| 0.1 part by weight of | dibutyltin dilaurate |
| 0.3 part by weight of | a foam stabilizer based on silicone (DC 193 from Dow Corning) |
| 0.9 part by weight of | water |

B Component
Prepolymer from Example 2a 100 parts by weight of the A component and 161 parts by weight of the B component were processed as described in Example 1 to give an integral foam plate having a density of 550 g/l.

Example 3 (Comparative Example)

a) Preparation of the Prepolymer 76 parts by weight of pure MDI and 2 parts by weight of uretonimine-modified pure MDI (Lupranat® MM 103, BASF AG) were melted under a nitrogen atmosphere in a three-necked flask and admixed at 80° C. while stirring with 7 parts by weight of dipropylene glycol and 15 parts by weight of polyoxypropylene glycol having a hydroxyl number of 112 mg KOH/g, prepared using 1,2-propanediol as initiator molecule. To complete the reaction, the mixture was held at 80° C. for 1 hour and subsequently allowed to cool. This gave a virtually colorless liquid having an NCO content of 20.6% and a viscosity (at 25° C.) of 1050 mPa·s. The liquid was stable on storage at room temperature.

b) Production of the Integral Foam

| A component | |
|---|---|
| 88.3 parts by weight of | polyoxypropylene (80% by weight)-polyoxyethylene (20% by weight) glycol having a hydroxyl number of 27, prepared using 1,2-propanediol as initiator molecule |
| 10.3 parts by weight of | 1,4-butanediol |
| 0.75 part by weight of | triethylenediamine |
| 0.02 part by weight of | dibutyltin dilaurate |
| 0.18 part by weight of | a foam stabilizer based on silicone (DC 193 from Dow Corning) |
| 0.47 part by weight of | water |

B Component
Prepolymer from Example 3a 100 parts by weight of the A component and 64 parts by weight of the B component were intensively mixed at 23° C. and the reaction mixture was introduced into a plate-shaped mold of aluminum having the dimensions 20 cm×20 cm×1 cm and heated to 50° C. in such an amount that after foaming and allowing to cure in the closed mold there resulted an integral foam plate having an overall density of 550 g/l.

To summarize, the properties of the prepolymers and the integral foams produced therefrom are shown for comparison in the two Tables 1 and 2. The mechanical properties of the foam plates such as tensile strength, elongation and tear propagation resistance, and also the Shore hardness, were virtually identical.

To determine the shrinkage, two integral foam plates having a density of 300 and 400 g/l respectively were produced in each case.

TABLE 1

(prepolymers)

| | NCO content | Viscosity | Storage stability (RT) |
|---|---|---|---|
| Ex. 1 | 12.5% by wt. | 1000 mPa · s | + |
| Ex. 2 | 12.4% by wt. | 1380 mPa · s | + |
| Ex. 3 (C) | 20.6% by wt. | 1050 mPa · s | + |

RT Room temperature
+ Stable on storage

TABLE 2

(integral foams)

| | A:B ratio (by weight) | Rebound resilience*) (%) | Shrinkage (d**) ≦ 400 g/l) |
|---|---|---|---|
| Ex. 1 | 100:183 | 51% | no |
| Ex. 2 | 100:161 | 50% | no |
| Ex. 3 (C) | 100:61 | 27% | yes |

*)DIN 53 512
**)Density

Examples 4 to 9 (integral foams of low density).

a) Preparation of the Prepolymer 57 parts by weight of pure MDI and 2 parts by weight of ureton-imine-modified pure MDI (Lupranat® MM 103 from BASF AG) were reacted as described in Example 1a with 41 parts by weight of a polyoxypropylene (80%)-polyoxyethylene (20%) glycol having a hydroxyl number of 27 mg KOH/g and prepared using 1,2-propanediol as initiator molecule.

This gave a virtually colorless liquid having an NCO content of 12.8% and a viscosity of 1018 mPa·s at 25° C.

b) Production of the Integral Foams

| A component | |
|---|---|
| 77 parts by weight of | polyoxypropylene (80%)-polyoxyethylene (20%) polyol having a hydroxyl number of 27 mg KOH/g, prepared using glycerol as initiator. |
| 20 parts by weight of | 1,4-butanediol |
| 1 part by weight of | triethylenediamine |
| 0.1 part by weight of | dibutyltin dilaurate |

-continued

| | A component |
|---|---|
| 0.3 part by weight of | foam stabilizer based on silicone (DC 193 from Dow Corning) proportion of water as indicated in Table 3. |

The A component and the prepolymer were mixed in a weight ratio of 53:100 and converted into integral foams by curing in a closed aluminum mold. The overall density of the integral foams was varied by means of the amount of reaction mixture placed in the mold. The measured mechanical properties of the integral foam plates are shown in Table 3.

TABLE 3

| Example | 4 | 5 | 6 | 7 | 8 | 9 |
|---|---|---|---|---|---|---|
| Water (parts by weight based on the A component) | 1.6 | 1.6 | 1.6 | 1.6 | 2.0 | 2.0 |
| Density of molding (g/l) | 500 | 450 | 400 | 350 | 300 | 250 |
| Tensile strength (N/mm$^2$) | 2.7 | 2.7 | 2.3 | 2.0 | 1.6 | 1.3 |
| Elongation at break (%) | 381 | 406 | 369 | 361 | 323 | 320 |
| Hardness (Shore A) | 52 | 49 | 45 | 38 | 31 | 23 |
| Rebound resilience (%) | 46 | 46 | 47 | 46 | 41 | 36 |

Example 1 (Comparison)

The procedure of the comparative experiment described in Example 3 was repeated, but the amount of water was increased to 0.6 part by weight/100 parts by weight of A component. This gave a foam having a free-foamed density of 170 g/l, but the foam shrank strongly.

Low-density moldings for determining the mechanical properties could not be produced since the parts shrank at densities below 450 g/l.

Example 11
a) Preparation of a Prepolymer from Polypropylene Glycol

| 45 parts by weight of | pure MDI and |
|---|---|
| 55 parts by weight of | a polyoxypropylene glycol having a hydroxyl number of 56 mg KOH/g | were reacted as described in Example 1.
This gave a virtually colorless liquid having an NCO content of 12.6% and a viscosity of 1148 mPa·s at 25° C.
b) Production of an Integral Foam

| | A component |
|---|---|
| 74 parts by weight of | triol as described in Example 1 |
| 23 parts by weight of | 1,4-butanediol |
| 1.5 parts by weight of | triethylenediamine |
| 0.1 part by weight of | dibutyltin dilaurate |
| 0.35 part by weight of | foam stabilizer (DC 193) |
| 1.2 parts by weight of | water |

The A component and the prepolymer were mixed in a weight ratio of 47:100 and foamed described in Example 1.

The properties of the resulting integral foam are shown in Table 4.

Example 12
a) Preparation of a Prepolymer

| 43.5 parts by weight of | pure MDI |
|---|---|
| 2.0 parts by weight of | uretonimine-modified pure MDI (Lupranat ® MM 103) |
| 54.5 parts by weight of | polyoxypropylene (80%)-polyoxyethylene (20%) polyol having an OH number of 56 and using 1,2-propanediol as initiator |

This gave a virtually colorless liquid having an NCO content of 12.9% and a viscosity of 1040 mPa·s.
b) Production of an Integral Foam

| | A component |
|---|---|
| 77.5 parts by weight of | a polyoxypropylene (80%)-polyoxyethylene (20%) polyol having an OH number of 27, prepared using glycerol as initiator |
| 20 parts by weight of | 1,4-butanediol |
| 1.0 part by weight of | triethylenediamine |
| 0.1 part by weight of | dibutyltin dilaurate |
| 0.35 part by weight of | foam stabilizer (DC 193) |
| 1.0 part by weight of | water |

The A component was reacted with the prepolymer in a weight ratio of 55:100.
The properties of the integral foam are shown in Table 4.

Example 13
(Integral foam using polytetrahydrofuran as polyol component)

| | A component |
|---|---|
| 37.6 parts by weight of | polyoxypropylene (80%)-polyoxyethylene (20%) polyol, OH number 27, prepared using glycerol as initiator |
| 40.0 parts by weight of | polytetrahydrofuran having an OH number of 56 mg KOH/g |
| 20.0 parts by weight of | 1,4-butanediol |
| 0.35 part by weight of | foam stabilizer (DC 193) |
| 0.1 part by weight of | dibutyltin dilaurate |
| 1.0 part by weight of | triethylenediamine |
| 1.0 part by weight of | water |

B Component: Prepolymer from Example 1.
A and B components were reacted in a ratio of 53:100.
The mechanical properties of the resulting integral foam are shown in Table 4.

Example 14
(Production of an integral foam using graft polyols)

| | A component |
|---|---|
| 42.0 parts by weight of | polyoxypropylene (80%)-polyoxyethylene (20%) polyol, OH number 27, prepared using glycerol as initiator molecule |

-continued

| | A component |
|---|---|
| 42.0 parts by weight of | the above polyethertriol which, however, contains 30% by weight of grafted-on styrene-acrylonitrile (1:1). The OH number of the grafted polyol is 25 mg KOH/g |
| 13.5 parts by weight of | 1,4-butanediol |
| 1.0 part by weight of | triethylenediamine |
| 0.1 part by weight of | dibutyltin dilaurate |
| 0.35 part by weight of | foam stabilizer DC (193) |
| 1.0 part by weight of | water |

B Component

Reaction product of 45 parts by weight of pure MDI and 55 parts by weight of a polyoxypropylene (80%) - polyoxyethylene (20%) glycol having an OH number of 27, prepared using 1,2-propanediol as initiator.

The NCO content of the prepolymer was 13.9%, the viscosity was 950 mPa·s. The A and B components were reacted in a ratio of 77:100. The mechanical properties of the resulting integral foams are shown in Table 4.

Example 15 (Comparison)

| | A component |
|---|---|
| 69.0 parts by weight of | a polyoxypropylene (80%)-polyoxyethylene (20%) polyol having an OH number of 27 and using 1,2-propanediol as initiator |
| 19.0 parts by weight of | a polyoxypropylene (80%)-polyoxyethylene (20%) polyol having an OH number of 27 and using glycerol as initiator |
| 10.5 parts by weight of | 1,4-butanediol |
| 0.75 part by weight of | triethylenediamine |
| 0.02 part by weight of | dibutyltin dilaurate |
| 0.20 part by weight of | foam stabilizer (DC 193) |
| 0.50 part by weight of | water |

B Component
Prepolymer from Example 3 (Comparative Example)

The A and B components were mixed in a ratio of 100:67 and a molding having a density of 550 g/l was produced. The mechanical properties of the resulting integral foam are shown in Table 4.

TABLE 4

| Example | 11 | 12 | 13 | 14 | 15 |
|---|---|---|---|---|---|
| Density of the moldings (g/l) | 550 | 550 | 550 | 550 | 550 |
| Tensile strength (N/mm²) | 5.1 | 5.8 | 4.5 | 5.0 | 4.6 |
| Elongation at break (%) | 447 | 425 | 437 | 416 | 419 |
| Hardness (Shore A) | 60 | 62 | 61 | 57 | 62 |
| Rebound resilience (%) | 46 | 43 | 54 | 45 | 29 |

We claim:

1. A process for producing high elasticity polyurethane moldings having a compact surface and a cellular core comprising the step of reacting
   a) modified organic polyisocyanate with
   b) at least one compound containing at least two reactive hydrogen atoms and having a molecular weight of from 1000 to 8000, and optionally
   c) chain extenders, in the presence of
   d) blowing agents,
   e) catalysts and, if desired,
   f) auxiliaries and/or additives in a closed mold with compaction, wherein the modified organic polyisocyanate a) comprises the reaction product of 4,4'-diisocyanatodiphenylmethane with at least one polyoxypropylene polyol and/or polyoxypropylene-polyoxyethylene polyol, the modified organic polyisocyanate has an NCO content of <15% by weight, the chain extenders c) comprise diols having a molecular weight of <400, the weight ratio of a) to the sum of the components b) to f) in the reaction is greater than 1, the blowing agent d) comprises water, and wherein the components a) through f) are reacted in amounts sufficient to provide polyurethane moldings having a density below 400 grams per liter and a rebound resilience in accordance with DIN 53512 of at least 35%.

2. A process as claimed in claim 1, wherein the modified organic polyisocyanate a) has an NCO content of <13% by weight.

3. A process as claimed in claim 1, wherein the modified organic polyisocyanate a) comprises the reaction product of 4,4'-diisocyanatodiphenylmethane and at least one polyoxypropylene diol and/or triol and/or polyoxypropylene-polyoxyethylene diol and/or triol.

4. A process as claimed in claim 1, wherein the polyoxypropylene polyol and/or polyoxypropylene-polyoxyethylene polyol used for preparing the modified organic polyisocyanate a) has a molecular weight of from 1000 to 8000.

5. A process as claimed in claim 1, wherein the polyoxypropylene polyol and/or polyoxypropylene-polyoxyethylene polyol used for preparing the modified organic polyisocyanate a) has a molecular weight of from 2000 to 6000.

6. A process as claimed in claim 1, wherein the modified organic polyisocyanate a) comprises the reaction product of 4,4'-diisocyanatodiphenylmethane and one or more diols based on polyoxypropylene having polyoxyethylene units at the chain end, wherein >80% of the terminal hydroxyl groups are primary hydroxyl groups.

7. A process as claimed in claim 1, wherein the modified organic polyisocyanate a) comprises a reaction product of 4,4'-diisocyanatodiphenylmethane and up to 5%, based on the weight of 4,4'-diisocyanatodiphenylmethane, of a high functional polyisocyanate selected from the group consisting of allophanate-modified polyisocyanate, uretonimine-modified polyisocyanate, polyphenylene polymethylene polyisocyanate, and mixtures thereof, with at least one polyoxypropylene polyol or polyoxypropylene-polyoxyethylene polyol.

8. A process as claimed in claim 7, wherein the modified organic polyisocyanate a) has an NCO content of <13% by weight.

9. A high elasticity polyurethane molding having a compact surface and a cellular core, comprising the reaction product of
   a) modified organic polyisocyanate with
   b) at least one compound containing at least two reactive hydrogen atoms and having a molecular weight of from 1000 to 8000, and optionally
   c) chain extenders, in the presence of
   d) blowing agents,
   e) catalysts and, if desired, f) auxiliaries and/or additives in a closed mold with compaction, wherein the modified organic polyisocyanate a) comprises the reaction product of 4,4'-diisocyanatodiphenylmethane with at least one polyoxypropylene polyol and/or polyoxypropylene-polyoxyethylene polyol, the modified organic polyisocyanate has an NCO content of <15% by weight, the chain extenders c) comprise diols having a molecular weight of <400, the weight ratio of a) to the sum of the components b) to f) in the reaction is greater than 1, the blowing agent d) comprises water, and wherein said polyurethane molding has a density below 400 grams per liter and a rebound resilience in accordance with DIN 53512 of at least 35%.

10. A polyurethane molding according to claim 9, wherein the modified organic polyisocyanate a) has an NCO content of <13% by weight.

11. A polyurethane molding according to claim 9, wherein the modified organic polyisocyanate a) comprises the reaction product of 4,4'-diisocyanatodiphenylmethane and at least one polyoxypropylene diol and/or triol and/or polyoxypropylene-polyoxyethylene diol and/or triol.

12. A polyurethane molding according to claim 9, wherein the polyoxypropylene polyol and/or polyoxypropylene-polyoxyethylene polyol used for preparing the modified organic polyisocyanate a) has a molecular weight of from 1000 to 8000.

13. A polyurethane molding according to claim 9, wherein the polyoxypropylene polyol and/or polyoxypropylene-polyoxyethylene polyol used for preparing the modified organic polyisocyanate a) has a molecular weight of from 2000 to 6000.

14. A polyurethane molding according to claim 9, wherein the modified organic polyisocyanate a) comprises the reaction product of 4,4'-diisocyanatodiphenylmethane and one or more diols based on polyoxypropylene having polyoxyethylene units at the chain end, wherein >80% of the terminal hydroxyl groups are primary hydroxyl groups.

15. A polyurethane molding according to claim 9, wherein the modified organic polyisocyanate a) comprises a reaction product of 4,4'-diisocyanatodiphenylmethane and up to 5%, based on the weight of 4,4'-diisocyanatodiphenylmethane, of a high functional polyisocyanate selected from the group consisting of allophanate-modified polyisocyanate, uretonimine-modified polyisocyanate, polyphenylene polymethylene polyisocyanate, and mixtures thereof, with at least one polyoxypropylene polyol or polyoxypropylene-polyoxyethylene polyol.

16. A polyurethane molding according to claim 15, wherein the modified organic polyisocyanate a) has an NCO content of <13% by weight.

* * * * *